United States Patent [19]  
Moreland

[11] 3,915,735  
[45] Oct. 28, 1975

[54] PROCESS FOR PREPARING MODIFIED SILICIC FILLERS

[75] Inventor: James E. Moreland, Hot Springs, Ark.

[73] Assignee: Malvern Minerals Company, Hot Springs, Ark.

[22] Filed: Mar. 6, 1974

[21] Appl. No.: 448,501

[52] U.S. Cl. ........ 106/308 Q; 106/308 N; 106/309; 260/40 R
[51] Int. Cl.² ............................................ C08J 3/00
[58] Field of Search............ 106/308 Q, 308 N, 309, 106/288 B; 260/40 R

[56] References Cited
UNITED STATES PATENTS

| | | | |
|---|---|---|---|
| 3,227,675 | 1/1966 | Papalos | 106/308 Q |
| 3,677,784 | 7/1972 | Nitzsche et al. | 106/288 B |
| 3,740,371 | 6/1973 | Segal | 106/288 B |

Primary Examiner—Patrick P. Garvin  
Assistant Examiner—J. V. Howard  
Attorney, Agent, or Firm—George F. Helfrich

[57] ABSTRACT

A monomeric silane is sprayed or poured onto microcrystalline novaculite which is being agitated in a high intensity mixing apparatus at a temperature between about 70°F and 350°F, and the monomeric silane and microcrystalline novaculite are allowed to remain in situ at a temperature between about 70°F and 350°F for at least about 1 minute.

Especially advantageous results are obtained when: (a) the microcrystalline novaculite is a granular lameller and clustered structure having an aged surface, a particle size of between about 0.25 $\mu$ and about 150 $\mu$, and a specific heat of about 0.19 cal/g/°C; and (b) the monomeric silane is an organosilicon compound having the general formula R—Si $X_3$, wherein R is a group attached to the silicon in a thermally and hydrolytically stable manner and X is a hydrolyzable group selected from chlorine, bromine, iodine, alkoxy, and acetoxy.

The modified silicic fillers so prepared have special utility in enhancing the properties of polymeric compositions.

5 Claims, No Drawings

PROCESS FOR PREPARING MODIFIED SILICIC FILLERS

BACKGROUND OF THE INVENTION

1. Field of the Invention

This invention relates in general to fillers for use in improving the properties of polymeric compositions. It relates in particular to an improved process for preparing modified silicic fillers having such utility.

2. Prior Art

In the industrial utilization of polymeric compositions, esp. in the fabrication of articles of various kinds therefrom, it is very frequently desired that the composition employed contain a filler of some kind. Inert (non-reinforcing) fillers render polymeric compositions less expensive and more readily processable, and reinforcing fillers improve such physical, chemical, and electrical properties as tensile strength, impact strength, flexural strength, tear resistance, abrasion resistance, moisture resistance, chemical resistance, and dielectric constant. Many polymeric compositions which are virtually useless alone are converted into highly serviceable products by combining them with the proper amount of appropriate filler. The action of a filler is consequently dependent upon its nature, the type of polymer(s) with which it is employed, and the actual amount of filler present in the polymer/filler mixture.

Silicic forms were first used predominantly as inert (non-reinforcing) fillers and thixotropic agents, i.e., to promote high viscosity at low shear rates in liquid polymeric systems. Some of the ultrafine particle size silicas, however, were found to significantly improve properties in silicone rubber and automobile tire carcass stocks. Although natural, mined silicas have shown a semi-reinforcing action in silicone rubber systems, the lack of specific chemical affinity for other types of rubbers and/or their relatively large particle size have prevented mined silicas from assuming roles as reinforcing fillers in other elastomeric systems. Moreover, their spherical (as opposed to needle-like or fibrous) shape and comparatively closed surface have prevented mined silicas from assuming roles as reinforcing fillers in thermosetting and thermoplastic resin systems.

The presence of silanol groups on the surface of silica has inspired attempts to modify the surface functionality of the silica to yield increased reactivity and consequent coupling with the polymer matrix. Initial studies have lent encouragement to the proposition that such a modification might be effected using monomeric silanes. Reference is made to R. L. Kaas, et al., "Interaction of Alkoxy Silane Coupling Agents With Silica Surfaces," *Polym. Eng. Sci.* 1971, 11 (1), 11–18; M. L. Hair, et al., "Reactions of Chlorosilanes With Silica Surfaces," *J. Phys. Chem.* 1969, 73 (7), 2372–8; and S. Sterman, et al., "Silane Coupling Agents as Integral Blends in Resin-Filler Systems," *Modern Plastics*, July 1973, 125–138. However, extensive commercial utilization of silane-modified silicic fillers has been delayed because of the relatively high cost of their production and/or the variations in their effectiveness.

SUMMARY OF THE INVENTION

It is consequently the primary object of this invention to provide what is unavailable in the prior art — viz., a very simple and economical, yet highly efficient and efficacious process for modifying the surface functionality of a silica so that it is readily available and eminently suitable for use as a reinforcing filler in polymeric compositions.

This object is achieved, and the disadvantages of prior art processes are obviated, by the practice of a process which comprises spraying or pouring between about 0.01 and 5.0 percent by weight of a monomeric silane onto a microcrystalline novaculite which is being agitated in a high intensity mixing apparatus at a temperature between about 70°F and 350°F. The microcrystalline novaculite and the monomeric silane are allowed to remain in contact in situ at a temperature between about 70°F and 350°F for at least about 1 minute. Especially advantageous results are achieved when: (a) the microcrystalline novaculite is a granular lameller and clustered structure having an aged surface, a particle size of between about 0.25 $\mu$ and 150 $\mu$, and a specific heat of about 0.19 cal/g/°C; and (b) the monomeric silane is an organosilicon compound having the general formula $R — Si\ X_3$, wherein R is a group attached to the silicon in a thermally and hydrolytically stable manner, R being selected from the class consisting of aliphatic, cycloaliphatic, aromatic, amino, polyamino, mercapto, methacrylo, glycidoxy, epoxy, vinyl, aminopropyl, mercaptopropyl, methacrylopropyl, methacryloxypropyl, glycidoxypropyl, epoxypropyl, chloroalkyl, and epoxycyclohexyl; and X is a hydrolyzable group selected from chlorine, bromine, iodine, alkoxy, and acetoxy.

Furthermore, it has been found of especial advantage when R is epoxy, amino, or polyamino that an interaction temperature of between about 300°F and 350°F be achieved, at which temperature the monomeric silane and microcrystalline novaculite are allowed to remain in contact in situ for at least about 1 minute. Moreover, in the practice of the present invention, the temperature necessary for the interaction of monomeric silane and microcrystalline novaculite is conveniently and advantageously attained by utilization of the frictional heat generated in the microcrystalline novaculite by the high intensity mixing apparatus.

As is fully developed hereinbelow, the microcrystalline novaculite employed in the process according to the present invention is decidedly different from other silicas (ground or precipitated) heretofore interacted with monomeric silanes in attempts at the preparation of reinforcing fillers. Its primary physical properties (e.g., its aged surface), as well as its secondary physical properties (e.g., its oil adsorption characteristics), reveal a material which cannot be expected to behave in a fashion similar to the silicas employed by the prior art. That the microcrystalline novaculite used in the practice of the present invention has any utility in the general process of preparing reinforcing fillers by reacting silicas with monomeric silanes is therefore not foreseeable by one of skill in the art. That the results of its utilization are so highly advantageous is indeed surprising, a fortiori.

DESCRIPTION OF THE PREFERRED EMBODIMENTS

In accordance with the process of the present invention, the silicic form utilized is a microcrystalline novaculite, which is a low (i.e., small particle size) alpha quartz form of $SiO_2$, such as is found in abundance in the upper stratum of the geologic area referred to as the "Novaculite Uplift" in western Arkansas. In contradistinction of silicic forms which must be crushed and pulverized to reduce large quartz grains to low micron sizes, the microcrystalline novaculite as employed herein is essentially unground. Whereas freshly crushed and pulverized quartz forms present a highly disturbed surface which often comprises a layer of nonquartz silica 30 to 60 $\mu\mu$ thick, the essentially unpulverized microcrystalline novaculite has an undisturbed or "geologically aged" surface. The microcrystalline novaculite is granular, lameller, and clustered, i.e., it is low alpha quartz in a loose or semi-bound, friable state of subdivision, the particle size of which varies between about 0.25 $\mu$ and about 150 $\mu$. Both the clusters and particulates comprising the clusters are generally cubic in configuration and lack the sharp and jagged points found in crushed and pulverized silicas. Although the microcrystalline novaculite has a greater surface area than ground silica forms, it has a decidedly lower oil adsorption characteristic. Moreover, the specific heat of the microcrystalline novaculite has been measured at 0.19 cal/g/°C, which is about 40% lower than other silicas. Clearly the microcrystalline novaculite employed in the practice of the present inventive process is a very uncommon "variety" of a very common mineral, $SiO_2$, as it has a number of characteristics which are unusual in the extreme.

The monomeric silane employed in the process of the instant invention is one or more of a large number of organosilicon compounds denominated "silanes" and having the general formula $R—Si\ X_3$, wherein R is a group attached to the silicon in a thermally and hydrolytically stable manner and X is a hydrolyzable group. Particularly advantageous results have been achieved when R is a group selected from the class consisting of aliphatic, cycloaliphatic, aromatic, amino, polyamino, mercapto, methacrylo, glycidoxy, epoxy, vinyl, aminopropyl, mercaptopropyl, methacrylopropyl, methacryloxypropyl, glycidoxypropyl, epoxypropyl, chloroalkyl, and epoxycyclohexyl; and X is a group selected from chlorine, bromine iodine, alkoxy, and acetoxy. As purely exemplary of such compounds, the following silanes are listed, which are currently available in commercial quantities: ethyltriethoxysilane, trimethylchlorosilane, phenyltriethoxysilane, vinyltriacetoxysilane, gamma-glycidoxypropyltrimethoxysilane, gamma-mercaptopropyltrimethoxysilane, aminotrimethoxysilane, polyaminotrimethoxysilane, gamma-aminopropyltriethoxysilane, gamma-methacryloxypropyltrimethoxysilane, vinyltrichlorosilane, beta-(3,4-epoxycyclohexyl)-ethyltrimethoxysilane, gamma-methacrylopropyltrimethoxysilane, cyclohexyltriethoxysilane, among many others. Most commonly, an organofunctional group is separated from the silicon atom in the silane molecule by a propyl group, and the hydrolyzable group is alkoxy (quite often methoxy). Since the organofunctional group is the means by which the silane reacts with polymeric materials, many types are needed to correspond with the different kinds and degrees of reactivity in the polymeric materials.

Interaction of monomeric silane and microcrystalline novaculite is effected according to the process of the present invention by spraying or pouring the liquid silane onto the microcrystalline novaculite while the novaculite is being agitated in a high intensity mixing apparatus. Solvents and/or diluents such as n-heptane are not present in the process of the present invention — i.e., the instant process is a "dry blending," as opposed to "slurry blending" process. Moreover, the present process is distinguished from one in which a bed of silicic filler is merely "tumbled" while the silane reactant is poured thereon. In the present invention the novaculite is subjected to intense agitation by means of a "high intensity" mixing apparatus, a number of which are available commercially for large scale blending operations. The "high intensity" mixing comprehended by the process of the present invention is exemplified by the employment of an apparatus comprising a mixing chamber and a plurality of mixing blades or discs of 1–2 feet in diameter, which, attached to a shaft passing through the chamber, are driven at 200–18,000 RPM. Quite advantageously, the frictional heat generated in the microcrystalline novaculite by such intense agitation is employed to effect the interaction between monomeric silane and microcrystalline novaculite. That is to say, the peripheral speed of the agitating blade or disc — which is a function of shaft revolutions per minute and blade or disc diameter — and the time of agitation are directly related to the temperature of the agitated novaculite, and both peripheral speed and time are taken into consideration in effecting a temperature between about 70°F and about 350°F in the agitated novaculite, after which the silane reactant is sprayed or poured thereupon. Of course, additional heat from external sources may also be applied, if desired for any reason; however care should be taken to ensure that the temperature of the agitated novaculite is between about 70°F and about 350°F before the silane is added.

Monomeric silane is added to the intensely agitated microcrystalline novaculite in an amount sufficient to provide between about 0.01 and about 5.0 percent by weight of silane, based upon the weight of the novaculite. Less than this amount will not result in a modified silicic filler, and more than this amount will not afford any additional improvement. The monomeric silane and microcrystalline novaculite are then allowed to remain in intimate contact preferably under intense agitation, at some temperature between about 70°F and 350°F for at least about 1 minute, and preferably for at least about 5 minutes, in order that the interaction between silane and novaculite be essentially completed. At the completion of the reaction, the modified silicic filler is cooled and removed from the mixing chamber for utilization in the enhancement of properties of polymeric compositions.

When, in the practice of the present invention, monomeric silanes having an R group selected from epoxy, amino, and polyamino are employed, it has been found of special advantage to use an interaction temperature of at least about 300°F for at least about 1 minute. Undesirable agglomeration of the particles of modified silicic filler — which would otherwise be present when these silanes are employed — is thereby avoided, and a finely-divided, homogeneous product is produced which is highly efficacious and completely acceptable as a reinforcing filler in polymeric compositions. For example, this technique is applicable when one or more of the following commercially available silanes is utilized: gamma-glycidoxypropyltrimethyoxysilane; aminotrimethoxysilane; and polyaminotrimethoxysilane.

Physical, chemical, and electrical properties (such as flexural strength, moisture and chemical resistance, and dielectric constant) of thermoplastic, thermosetting, and elastomeric polymer compositions (such as polyvinyl chloride, room temperature - cured epoxy resins, and diallylphthalate resins) have been significantly enhanced by the incorporation therein of about 5 to about 50 percent by weight of microcrystalline novaculite modified according to the process of the present invention using standard methods of blending, curing (where applicable) and fabrication. These results were especially significant when compared with those resulting from the use of (a) unmodified microcrystalline novaculite, (b) microcrystalline novaculite modified with a silane according to the "slurry blending" process well known in the art, and (c) microcrystalline novaculite modified with a silane according to the "dry tumbling" process well known in the art.

EXAMPLE 1

| | |
|---|---|
| Product Treated | 1500 pounds of a microcrystalline novaculite product measuring 100% less than 10 microns particle size and 2% less than one micron with average particle size about 4 microns. |
| Silane Used | A styryl amine coupling agent empirical formula |

| | |
|---|---|
| Mixer | Myers Engineering 550 Series Dual Range Disperser with tub for mixing, and other convenient and necessary appurtenances. |

A quantity of microcrystalline novaculite weighing 1,500 pounds was placed in the mixing tub. After insertion of the microcrystalline novaculite the temperature of the microcrystalline novaculite was measured at 100°F. The lid over the tub was secured. The single speed, high speed shaft with a circular mixing disc was then switched on. Next, the variable speed slow speed shaft with a blade was switched on and turned to its maximum speed setting of 10.

Ten minutes after both shafts had been switched on the elevated temperature of the microcrystalline novaculite was 140°F as determined by a probing thermometer which measured the temperature of the air inside the tub above the agitated microcrystalline novaculite.

Immediately the single speed, high speed shaft was stopped while the slow speed shaft was allowed to operate on a setting of 10. Next, 7½ pounds of the liquid styryl amine coupling agent was fed by gravity through a ½ inch pipe under a portable reservoir on legs, into and through an opening in the tub cover directly on and into the bed of microcrystalline novaculite being agitated by the slow speed shaft operating on a setting of 10. After the 7½ pounds of styryl amine coupling agent had evacuated the reservoir on and into the mass of agitated microcrystalline novaculite, the opening on the tub lid was closed and the single speed, high speed shaft was at once switched on.

Forty two minutes after the initial starting of both the single speed, high speed shaft and the variable slow speed shaft, the probing thermometer had reached 240°F. It has been determined that if the temperature above the microcrystalline novaculite in the tub is 240°F, that the temperature in the mass of the microcrystalline novaculite would be approximately 40°F higher or about 280°F.

The treatment was considered complete and the shafts were turned off and the treated material was removed from the tub.

The microcrystalline novaculite treated under this example was used as a reinforcing pigment in a phenolic tank lining baked on by a process well known in the art. The direct benefits of this type of coating were improved flexural strength, increased resistance of the coating to moisture permeation, water vapor transmission, and abrasion or wear.

Also, the coating had improved chemical resistance and very low ionic contamination contribution.

EXAMPLE 2

| | |
|---|---|
| Product Treated | 2,000 pounds of a microcrystalline novaculite product measuring 100% less than 10 microns particle size and 2% less than one micron with average particle size about 4 microns. |
| Silane Used | A gamma aminopropyltriethyoxysilane with an empirical formula $NH_2(CH_2)_3Si(OC_2H_5)_3$. |
| Mixer | Myers Engineering 550 Series Dual Range Disperser with tub for mixing, and other convenient and necessary appurtenances. |

A quantity of microcrystalline novaculite weighing 2,000 pounds was placed in the mixing tub. After insertion of the microcrystalline novaculite the temperature of the microcrystalline novaculite was measured at 75°F. The lid over the tub was secured. The single speed, high speed shaft with a circular mixing disc was then switched on. Next, the variable speed slow speed shaft with a blade was switched on and turned to its maximum speed setting of 10.

Eight and one half minutes after both shafts had been switched on the elevated temperature of the microcrystalline novaculite was 140°F as determined by a probing thermometer which measured the temperature of the air inside the tub above the agitated microcrystalline novaculite.

Immediately and while the single speed, high speed shaft was operating the slow speed shaft was reduced to a setting of 5. Next, 20 pounds of the liquid gamma amino coupling agent was fed by gravity through a ½ inch pipe under a portable reservoir on legs, into and through an opening in the tub cover directly on and into the bed of microcrystalline novaculite being agitated by both high and slow speed shafts. After the 20 pounds of gamma amino coupling agent had evacuated the reservoir on and into the mass of agitated microcrystalline novaculite, the opening on the tub lid was closed and the slow speed shaft was at once increased to a setting of 10.

Thirty-one and one half minutes after the initial starting of both the single speed, high speed shaft and the variable slow speed shaft, the probing thermometer had reached 260°F. It has been determined that if the temperature above the microcrystalline novaculite in the tub is 260°F, that the temperature in the mass of the microcrystalline novaculite would be approximately 40°F higher or about 300°F.

The treatment was considered complete and the shafts were turned off and the treated material was removed from the tub.

The microcrystalline novaculite treated under this example was used as a reinforcing pigment in a coil coating by a process well known in the art, but the polymer is unknown. The direct benefits of this type of coating were improved flexural strength, and increased resistance to moisture permeation, water vapor transmission, and abrasion or wear. The most important specific benefit of this type of coating provided by the treated microcrystalline novaculite was superior results when subjected to what is known as the reverse flex test.

Although the present invention has been specified in detail with respect to certain preferred embodiments thereof, it is clear to those of skill in the art that variations and modifications in this detail may be effected without any departure from the spirit and scope of the present invention, as defined in the hereto-appended claims.

What is claimed is:

1. A process for the preparation of a modified silicic filler having special utility in enhancing the properties of polymeric compositions, which process comprises effecting interaction between a microcrystalline novaculite and 0.01 to 5.0 percent by weight, based upon the weight of the microcrystalline novaculite, of a monomeric silane, the interaction being effected by spraying or pouring the monomeric silane onto the microcrystalline novaculite being agitated in a high intensity mixing apparatus at a temperature between about 70°F and about 350°F, and allowing the monomeric silane and microcrystalline novaculite to remain in situ at a temperature between about 70°F and about 350°F for at least about 1 minute.

2. The process of claim 1, wherein the microcrystalline novaculite is a granular lameller and clustered structure having an aged surface, a particle size of between about 0.25 $\mu$ and about 150 $\mu$, and a specific heat of about 0.19 cal/g/°C.

3. The process of claim 2, wherein the monomeric silane is an organosilicon compound having the general formula $R-SiX_3$, wherein R is a group attached to the silicon in a thermally and hydrolytically stable manner, R being selected from the class consisting of aliphatic, cycloaliphatic, aromatic, amino, polyamino, mercapto, methacrylo, glycidoxy, epoxy, vinyl, aminopropyl, mercaptopropyl, methacrylopropyl, methacryloxypropyl, glycidoxypropyl, epoxypropyl, chloroalkyl, and epoxycyclohexyl; and X is a hydrolyzable group selected from chlorine, bromine, iodine, alkoxy, and acetoxy.

4. The process of claim 3, wherein R is a group selected from epoxy, amino, and polyamino, and an interaction temperature of at least about 300°F is achieved, at which temperature the monomeric silane and microcrystalline novaculite are allowed to remain in situ for at least 1 minute.

5. The process of claim 1, wherein the frictional heat generated in the microcrystalline novaculite by the high intensity mixing apparatus is employed to effect the interaction between the monomeric silane and the microcrystalline novaculite.

* * * * *